Sept. 22, 1953 R. H. DREISBACH 2,653,019
"WOW" ANALYSIS APPARATUS
Filed June 10, 1949

INVENTOR.
Robert H. Dreisbach
BY
Clarence J. Loftus
Atty.

Patented Sept. 22, 1953

2,653,019

UNITED STATES PATENT OFFICE 2,653,019

"WOW" ANALYSIS APPARATUS

Robert H. Dreisbach, Fort Wayne, Ind., assignor to The Magnavox Company, Fort Wayne, Ind., a corporation of Delaware Application June 10, 1949, Serial No. 98,292

4 Claims. (Cl. 264—1)

This invention relates to "wow" analysis apparatus, or, more accurately stated, to apparatus for analyzing the movement of a phonograph turntable, as an aid to detecting any deviations from proper speed of rotation that might result in "wow" in the reproduced sound, and locating the causes of such faults.

In the sound recording and reproducing arts the term "wow" is applied to a changing of pitch which occurs at a low rate. If the rate is 1.5 C. P. S. or lower the effect is one of a drifting of pitch, whereas if the rate is about 20 C. P. S. or higher it produces a type of vibrato effect usually termed "flutter." The term "wow" is usually applied to all rates between 1.5 and 20 C. P. S., but will here be used as a single term to include rates below 1.5 C. P. S. and above 20 C. P. S. In all cases, the presence of "wow" is fatal to high quality sound reproduction, but it is very difficult to locate and correct the conditions giving rise to it.

Ordinarily the speed variations causing "wow" arise from minor mechanical faults in the mechanism of the recorder or reproducer, and consequently these variations repeat at regular intervals. For example, assume that a phonograph record is perfectly recorded but is reproduced on a turntable having its spindle eccentric. The result of this eccentricity will be a reduction and increase in pitch of the reproduced sound once each revolution. If the turntable normally revolves at the standard rate of 78 R. P. M. the "wow" will be at the rate of 1.3 cycles per second. Similarly, an elliptical rim driven turntable can cause a "wow" at a rate corresponding to double its speed of revolution, or 2.6 cycles.

Also, as an example, there may occur an irregularity in the driving system which lasts for only 1/10 of a turntable revolution but only occurs once per revolution. This causes a "wow" of a 13 C. P. S. frequency with a repetition rate of 1.3 C. P. S.

It is thus seen that "wow" caused by a mechanical imperfection in any part of the turntable driving mechanism will have a characteristic frequency. It has accordingly been proposed that these imperfections might be localized by analyzing the "wow" frequencies produced. Having the analysis, this would be easy to do as one knows the rotational speed of each of the elements in the driving system and can correlate these with the "wow" frequencies observed.

Much effort has been expended on devising apparatus to measure the amount of "wow" from phonograph turntables and the like. In a conventional "wow" tester a tone wheel or fixed frequency recording is used as a signal source. This signal is then mixed with an oscillator and a counter circuit is used to measure the beat frequency and indicate the degree of frequency variation. In other arrangements the signal source is fed to a frequency discriminator circuit which in turn feeds a low frequency amplifier and indicator. In all of these a limiter is also required to eliminate any amplitude variations.

These arrangements are cumbersome and have numerous weaknesses. The recording or the tone wheel is always questionable as a "wow"-free source. Neither is ever operated with true concentricity. The average speed of the turntable may be different than that desired, which makes it necessary to change the frequency of the beating oscillator or retune the discriminator. Also, satisfactory discriminators are difficult to build at the frequencies most desirable as a signal source.

These conventional arrangements obviously require complex electronic circuits for the oscillator, limiter, discriminator and frequency measuring functions, and presuppose operation by a highly skilled technician, yet even then the results attained have not been entirely satisfactory. Slow drifts of the oscillator and the signal source combined with the long time constants required in the equipment makes its operation very time-consuming and results in inconsistent data. Probably most important, however, is the fact that devices heretofore devised for measuring "wow" show only the absolute deviation in pitch between the sound being reproduced and the original recorded frequency, whereas the most important point to be determined from a standpoint of reproduction satisfactory to the individual listener is the rate of deviation, rather than the actual limits of deviation from true pitch. That is, a gradual rise and fall of pitch is less noticeable and less objectionable to the human ear than a sharp change, even though the change in pitch may be the same in each case. It follows that, for highest quality reproduction, it is essential to locate and eliminate any mechanical defects in the turntable mechanism that may introduce significant momentary periods of acceleration or deceleration, even though the absolute frequency deviation caused thereby is within acceptable limits.

It is therefore a primary object of the present invention to provide a "wow" detecting device including means directly responsive to changes in turntable speed to generate a signal voltage, together with means to analyze the signal and determine its frequency content.

A further object of the invention is to provide a testing device including means on a phonograph turntable to generate a voltage corresponding to the acceleration and deceleration of the turntable from its average speed. Thus, this voltage may be frequency analyzed to determine the source of variations in the turntable speed.

It is a further object to provide a "wow" detecting device comprising a piezoelectric element together with a shiftable mass and means responsive to movement of the mass for flexing the piezoelectric element; wherein the element and the mass are so arranged and oriented that the centrifugal force and the force of gravity acting on the mass produce a minimum of response.

A further object of the invention is to provide means of detecting and measuring the manner in which a turntable varies from a constant speed, said detecting means comprising an assembly of two electro-mechanical transducers as accelerometers mounted diametrically opposite each other on the turntable with their electrical outputs combined.

By using an accelerometer mounted on the turntable I eliminate the usual trouble experienced with a tone frequency record not being concentric with the turntable as the accelerometer travels at a constant fixed radius.

By using two accelerometers mounted diametrically opposite each other and connecting them so that their electrical response to a rotational acceleration of the turntable is additive, their responses to accelerations due to vibration of the turntable in any plane will oppose and cancel each other and will therefore not appear in the combined electrical output.

The present preferred embodiment of the invention is illustrated in the drawing of this disclosure wherein.

Figures 1, 2, 3:
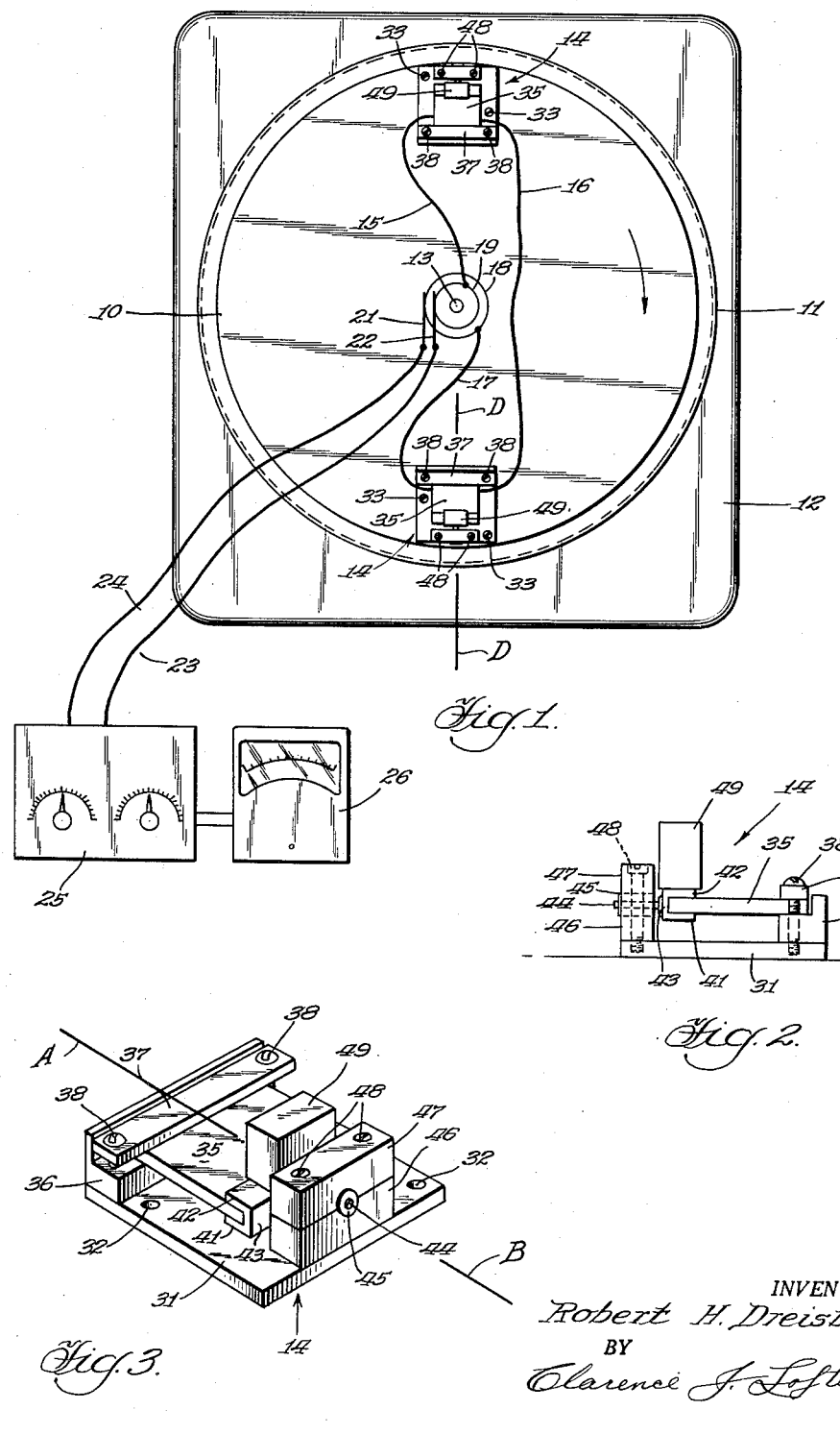
Figure 1 is a plan view of a phonograph turntable having "wow" analysis apparatus as here contemplated. The view includes a diagrammatic showing of a low frequency analyzer and meter by which the signal from the apparatus is analyzed and has a diagrammatic representation of the commutator rings by which the signal may be fed to the analyzer.
Figure 2 is a side elevational view of one of the accelerometers utilized in the invention.
Figure 3 is a perspective view thereof.

As shown, the apparatus includes a flat plate or disc 10 which may be positioned on the turntable 11 of any phonograph or record chamber mechanism 12 on which a test is to be made. The plate 10 has a central opening to receive the usual record spindle 13 so that the disc will be centered with respect to the axis of rotation of the turntable.

The disc carries a pair of identical and opposite accelerometer units 14 electrically in series with each other through conductors 15, 16 and 17 to a pair of commutator rings 18 and 19 diagrammatically shown in Figure 1. The units may be connected in parallel if desired. An output circuit is completed from the commutator rings through brushes 21 and 22 and thence through conductors 23 and 24 to a low frequency analyzer 25 and meter 26. These may be of conventional type. The accelerometer units each comprise a metal base plate or bracket 31 provided with screw holes 32. The brackets are secured in fixed position on the plate 10, as by machine screws or rivets 33.

The brackets 31 serve to support a piezoelectric crystal 35 clamped between an angle fitting 36 and a clamping bar 37 by machine screws 38 which, as shown, extend through the members 37 and 35 and are threaded into the plate 31. The crystal 35 is of the twister type, with its axis of twisting (shown by the line A–B) positioned horizontally and at a right angle to the mounting fittings 36 and 37. The opposite end of the crystal is clamped between flanges 41 and 42 of a crystal driving member 43. This member 43 carries a pin 44 which is on the twisting axis of the crystal and extends into and takes a bearing in a resilient sleeve bearing 45 clamped between mounting blocks 46 and 47. These blocks may be supported in any convenient manner, but as illustrated they are fastened to the fitting 31 by a pair of machine screws 48.

The crystal driving member 43 also carries a weight comprising a metal slug 49 secured to the flange 42 at a point above the twisting axis of the crystal, and unsupported at its upper end.

The accelerometer units are mounted on the turntable plate 10 so that the twisting axis A—B of each crystal lies on a line D extending diametrically across the plate. Thus when the apparatus is revolving at a constant and perfectly uniform velocity, the outward centrifugal force acting on the slug 49 will cause no perceptible bias tending to twist either crystal. In the event, however, of any acceleration or deceleration of the turntable, the inertia of the slug 49 will be effective to drive the crystal and give a signal fluctuation. The crystal may be driven either forward or back; that is, momentarily retarding the turntable which is rotating clockwise will cause the slug, which always tends to maintain its velocity unchanged, to cause a forward twisting of the crystal, while an acceleration of the turntable will drive the crystal in the opposite manner. Thus any variation of velocity in the turntable will result in a direct variation in the voltage potential fed to the meter 26 through the conductors 23 and 24 and the analyzer. It follows that this apparatus may be used to detect and locate any mechanical imperfection in the turntable mechanism that would cause speed fluctuations therein and that by the correction of these faults the turntable may be made capable of high fidelity reproduction without substantial deviations from true pitch. This result is accomplished by a mechanism that is far simpler and less expensive than types heretofore known, yet more satisfactory.

By these teachings the test signal is generated directly by the turntable motion so that no test record is required and no other factors, such as defects in the pickup, amplifier, oscillator or frequency meter influence the signal. The apparatus is thus easier to use than types employing a test record, since it is not influenced by any of the factors that may introduce false signals into the output and thus confuse the analysis. It is also advantageous in that it gives a signal directly in response to speed changes, rather than requiring the demodulation of a carrier signal to accomplish the result. In addition, it clearly indicates any sharp acceleration or deceleration even though the absolute frequency change is small.

The teachings of this invention have been disclosed herein in an embodiment particularly well suited to the use of crystal type accelerometers on conventional phonograph turntables, since this is the present preferred embodiment of the inventive teachings and ideally suited to a disclosure of the operating principles of the invention. It should be borne in mind, however, that this disclosure is by way of illustration of the principles involved rather than by way of limitation, and that various modifications or variations in the structure of the accelerometer units or their mountings may be indulged in without departing from these teachings. It is accordingly pointed out that the scope of the inventive concept extends to any variation or modification of the structures here shown coming within the terms of the appended claims.

Having thus described the invention, what I claim as new and desire to secure by United States Letters Patent is:

1. In "wow" analysis apparatus, a turntable accelerometer comprising a rotatable turntable plate and at least one electro-mechanical transducer mounted on said plate outwardly of its center; said transducer comprising a piezoelectric crystal of the twister type, a bearing supporting said crystal on its axis of twist, said axis being disposed radially of said turntable, and a weight supported on said crystal and offset from the bearing for rotation about the twisting axis of said crystal whereby acceleration or deceleration of the turntable causes the weight to drive the crystal.

2. In "vow" analysis apparatus, a turntable accelerometer comprising a rotatable turntable plate and at least one electro-mechanical transducer mounted on said plate; said transducer including an actuating weight pivotally mounted with respect to said plate outwardly of its center with the axis of pivotal movement extending radially of said plate whereby acceleration or deceleration of the turntable causes the weight to drive the transducer.

3. In "wow" analysis apparatus, a turntable accelerometer comprising a rotatable turntable plate and at least one electro-mechanical transducer mounted on said plate outwardly of its center, said transducer comprising a piezoelectric crystal, means for supporting said crystal with its axis of motion extending radially of said plate, and a weight mounted on said crystal in spaced relation to said axis whereby acceleration or deceleration of the turntable causes the weight to drive the crystal.

4. In "wow" analysis apparatus, a turntable accelerometer comprising a rotatable plate and at least one electro-mechanical transducer mounted on said plate, said transducer including a piezoelectric crystal of the twister type mounted on said plate with its axis of twist extending radially of said plate, and inertia means operatively connected with said piezoelectric crystal whereby variations in speed of rotation of said plate cause relative movement of said inertia means with respect to said plate.

ROBERT H. DREISBACH.

References Cited in the file of this patent

UNITED STATES PATENTS

| Number | Name | Date |
|---|---|---|
| 2,436,529 | Pressley | Feb. 24, 1948 |
| 2,487,035 | Weaver et al. | Nov. 1, 1949 |
| 2,488,586 | Diemer | Nov. 22, 1949 |
| 2,532,781 | Petersen | Dec. 5, 1950 |
| 2,539,620 | Graham | Jan. 30, 1951 |

FOREIGN PATENTS

| Number | Country | Date |
|---|---|---|
| 719,762 | France | Nov. 23, 1931 |